United States Patent
Joyce

(10) Patent No.: US 7,994,241 B2
(45) Date of Patent: Aug. 9, 2011

(54) WOOD COMPOSITE ALLOY COMPOSITION HAVING A COMPATIBILIZER THAT IMPROVES THE ABILITY TO PROCESS AND COMPRESS CELLULOSIC FIBER

(75) Inventor: Robert C. Joyce, Lambertville, MI (US)

(73) Assignee: Innovative Plastics and Molding RNE Tech, Whitemore Lake, MI (US)

( * ) Notice: Subject to any disclaimer, the term of this patent is extended or adjusted under 35 U.S.C. 154(b) by 71 days.

(21) Appl. No.: 12/321,093

(22) Filed: Jan. 15, 2009

(65) Prior Publication Data

US 2009/0182071 A1     Jul. 16, 2009

Related U.S. Application Data

(60) Provisional application No. 61/021,234, filed on Jan. 15, 2008.

(51) Int. Cl.
*C08L 97/02*     (2006.01)
*C08G 69/08*     (2006.01)

(52) U.S. Cl. .......................................... 524/13; 528/310

(58) Field of Classification Search ................... 524/13; 528/310
See application file for complete search history.

(56) References Cited

U.S. PATENT DOCUMENTS 7,214,420 B2     5/2007    Joyce

FOREIGN PATENT DOCUMENTS

| JP | 54068852 | * | 6/1979 |
| JP | 2004-204104 | * | 7/2004 |

* cited by examiner

*Primary Examiner* — Robert D. Harlan

(57) ABSTRACT

A crystalline polyamide 6 in a compounding extrusion process to make wood flour-polyolefin composite. The wood plastic composite pellet and can be post-blended with reinforced polyolefin pellets in an injection molding step to produce hybrid fibrous composites. The resulting compatibilization in the hybrid fibrous composites gives molded parts having enhanced mechanical properties at greatly reduced temperatures. There is wide variety of molded parts that can be made by varying the blend ratio of the wood plastic compounded product with or without and glass fiber reinforced pellets in the injection molding step.

11 Claims, No Drawings

WOOD COMPOSITE ALLOY COMPOSITION HAVING A COMPATIBILIZER THAT IMPROVES THE ABILITY TO PROCESS AND COMPRESS CELLULOSIC FIBER

CROSS REFERENCE TO RELATED APPLICATIONS

Application claims priority of U.S. Provisional Patent Application Ser. No. 61/021,234 filed Jan. 15, 2008

FIELD OF THE INVENTION

The present invention relates to particular wood plastic composite composition that is a heterogeneous alloy containing a semi crystalline polyolefin, maleic anhydride grafted polyolefin, a crystalline and or amorphous polymer, with high levels of cellulosic wood fibers in a classified flour at 50 to 80 wt percent that are compressed at a reduced moisture below 1 percent and preferably less than 0.5 percent. This wood plastic compound alloy composition with a crystalline and or amorphous polymer is designed to help molded articles by reduce particle fracture, improve processability, toughness, thermal, physical and structural properties that have been elusive to the wood composite industry.

BACKGROUND OF INVENTION

A polyolefin blended with wood flour particles can be compounded into a molded article, i.e. pellets. A wood plastic compounded pellet has been produced with considerable amount of voids which holds moisture. Because moisture isn't compatible with wood flour, injection molded components are not user friendly to process.

To make a wood plastic composite end product, such as an injection molded spindle, toys, automotive parts, etc. the wood plastic composite pellets are dried. These wood plastic compounded pellets can be blended with other virgin or compounded polymers in pellet form. These compounded pellets have ingredients for reinforcement such as glass and or mineral, to produce various types of molded products that are tailored to particular end-use applications.

To produce an extruded wood plastic composite pellet, in most instances, the wood fiber has gone through a drying process and must be reprocessed again before compounding because of the affinity of moisture, which can range from 8 to 14 percent in most instances. The reprocessing of the wood fiber, which is called classification, will help reduce moisture content and create a fiber size that will effectively distribute in the polymer matrix. The wood fibers are now of a flour consistency of a 20-120 mesh size. In addition, to classification, there are other forms of heat i.e. hot air or ovens that can help reduce wood flour moisture and prepare for compound extrusion. When compounding these ingredients, an intensive mixing or blending with a polymer, additives, lubricants, etc., to make a wood plastic composite pellet, more moisture removal is necessary. The compound extruder will have a single or multiple vents and or vacuums pull off or extract moisture and or gas. After the finished pellet is manufactured, it is transported to the injection molder. Because of the pellets affinity for moisture another 2 to 3% wt, will be added back into the pellet in the next 24 hrs. The injection molder will use a desiccant dryer or oven to reduce the moisture of the wood plastic composite pellet before processing. In all instances, drying the wood plastic composite compounded extrudate and or pellet must be completed and will add cost to the end product.

To alleviate the drying of the cellular wood fiber, inventions in material science have occurred in wood plastic compositions. These compositions include mineral, the mineral will absorb moisture from the wood. There are compositions to help keep the moisture or gas at a manageable level to effectively process a wood plastic molded article. Many wood plastic compositions will include low levels of wood flour, wood flour that has been pulverized or sheared by processing methods, high loading of lubrication and water, used as a plasticizer. There has been theories that implicate bound water is inherent in the wood plastic composite molded articles and that it cannot be controlled and or removed, thus producing voids or cellularity, consequently, weakening and causing unpredictable compositions in some cases. Consequently, when either compounding or injection molding, unless you can control moisture, especially; in high cellular fiber content loadings, reproducibility in manufacturing parts becomes difficult.

It is known that inorganic fibers such as glass, minerals, have been primarily used as filler in polymers such as polyolefin resins. These fillers are distributed in the polymer matrix to form compounded pellets that can be processed in a wide variety of downstream injection molding or extrusion fabrication processes. These fillers are inexpensive compared to the polymer. A wood fiber is a filler that can be blended with a thermoplastic and extruded to make compounded pellets. In most cases, the wood plastic compound will have maleic anhydride grafted polyolefin type of chemical coupling as the primary means for producing adhesion between hydrophobic or non-polar polyolefin matrix and polar wood fiber reinforcement, e.g. Seethamraju, et al. September 1999, U.S. Pat. No. 5,948,524 and "Wood Flour Filled Polypropylene Composites: Interfacial Adhesion and Micromechanical Deformations", L. Danyadi et al, Polym. Eng. & Sci. 47(8), pp 1246-1255 (August 2007). Moreover, physical properties of the chemical coupled wood fiber and polyolefin matrix will improve tensile strength, flexural strength, flexural modulus, i.e. "Wood filled Plastics—They need the right additives for Strength, Good looks and Long life" by Lilli Manolis Sherman, Senior editor. When adding inorganic fiber reinforcement, like glass fibers, to the polymer matrix, additional mechanical properties result. This enhancement is attributed to the entanglement between glass and wood fibers with the molecules of the polymer matrix to enhance the interfacial adhesion due to interactions with chemically coupled polyolefin.

In all instances, moisture must be controlled and or eliminated in a wood plastic composite compounded extrudate and or pellet and a molded article. A plastic composition with a high loading of wood flour will lack dispersion of couplings, especially polypropylene, a thermoplastic polyolefin and it is difficult to wet out all fibers to promote adequate wood fiber adhesion. Furthermore, the process window needs to be increased with highly filled wood compositions, burning of wood fiber is common. Thus, there exists a need for further improvement in composition to processing highly filled wood fiber composites.

It was observed by the inventor that a crystalline polyamide in a wood plastic compound containing wood flour, a semi crystalline polymer such as polypropylene with a maleic anhydride will enhance thermal and mechanical properties without degradation of the wood fiber and maintaining superior melt strength for molding. And, in fact, the addition of a crystalline or amorphous polymer with a semi crystalline polyolefin helped increase the processing window of the wood flour reducing the need for excessive lubrication and other additives. The polyamide introduced additional polarity that for a much needed compatibilization bridge to reduce wood fiber particle fracture in the polymer matrix. Also, the polyamide has a high resistance to mildew, fungi, and molds, this will help increase the longevity of the wood plastic composite. To produce a consistent low if not dry product, the compression of the cellulosic fibers, i.e. wood, along with the heterogeneous wood composite alloy composition ingredients, a processor can control moisture in the final end product.

DESCRIPTION OF THE INVENTION

The present invention relates to an alloy composition of a compounded wood-polyolefin pellet used for injection molding, extrusion, compression molding. The wood plastic compounded pellet contains wood flour at 50 to 80 wt. percent combined with a semi-crystalline polyolefin, a co polymer polypropylene, a homo polypropylene or a polyethylene and maleic anhydride, and minimal lubrication and the addition of polyamide (e.g. polyamide 6 or PA-6), a crystalline polymer.

The crystalline, polyamide 6, which can be also a copolymer, is amorphous in the molten state but upon cooling to 200° C. it tends to crystallize very rapidly. Furthermore, the polyamide 6, will tend to be mostly in the crystalline state, particularly when it is in contact with the wood flour particles that have hydroxyl groups that form strong H-bonds and covalent amide bonds with the nitrogen atom on the PA-6 molecule. The interaction between the hydroxyl groups and the polyamide will help to reduce moisture generation at the surface of the wood plastic compounded pellets at elevated processing temperatures. The polyamide combined with 2 wt % MAPP will increase interfacial adhesion between the wood fiber and a polyolefin matrix. The increase in the interfacial adhesion will help prevent wood fiber pull-out at elevated service temperature. There was also a great improvement in the reduction in part warp age and sink and the ability to chemically foam a part.

The preferred cellulosic reinforcement is a wood flour, but can be any combination of one or more other natural fibers, such as jute, switch grass, wheat straw, and will contain moisture inherent to its form before compounding.

These wood plastic compounded pellets, combined and or dry blended with a filled or compounded polyolefin pellet containing other natural fibers, glass fibers, minerals, lubrication, flame retardants, pigments make a wide variety of end-use composite. The wood plastic compounded pellets and glass fiber reinforced polypropylene pellets that are dry blended at the injection molded machine create a superior wood plastic compounded hybrid product that duplicate the flexural strength of dry wood of 1,000,000 psi.

The highly loaded wood fiber-reinforced polyolefin pellets are mixed with pellets of a virgin and or recycled polyolefin and or pre-compounded glass fiber reinforced and or mineral and fed to an injection molding machine or other types of molten forming equipment to make plasticized hybrid blends to suit a variety of end-use molding applications. An injection molding machine or any type of plasticating extruder, provides the necessary mixing and fiber dispersion to combine unlike fiber reinforcement that have an admixture of high shear and low shear material properties. The secondary process effectively wets out the wood flour and inorganic fiber particles (e.g. glass fibers) into a hybrid composite possessing a combination of desired material properties. The flexibility of varying the blend ratio of wood plastic compounded pellet and other types of fiber reinforced polyolefin pellets, i.e. glass, jute, hemp, sisal is advantageous to the end-user. This provides the fabricator with a wide spectrum of end-use properties without the need for doing separate compounding extrusion of composites of specific composition.

It so happens that the PA-6 ingredient does not remain a separate fibrous resin after the initial compounding extrusion step. The extrudate is now an alloy that is of a heterogeneous composition. Consequently, the processing window of the wood plastic compound is increased by the addition of the crystalline polyamide. This is realized in the compounding of the wood plastic compound and when creating a hybrid injection molded extrudate to make a molded article. The compounding extrusion temperatures are set at 460-480° F. in the first mixing zone of the twin screw extruder to provide the necessary softening state of the polyamide to for an effective compatibilization bridge between the polyolefin and MAPP molecules. The heat temperature profile, not including the first zone, set at 460 to 480° C. F, has seven additional temperature zones in the heat profile, having subsequent step down reductions of approximately 10-20° F. This step down-heat profile provides the necessary mixing, dispersion and devolatization which result in the compatibilization of the wood flour, polyolefin, polyamide, lubrication and MAPP ingredients.

A combination of a wood plastic composite pellet with a virgin or co reinforced pellet at various loadings, referred to a hybrid blend, requires much lower processing temperatures with minimal shear for injection molding of parts. The injection molding temperatures are set at 370-390° F. with a 2.5 to 1 screw ratio. Hence, the crystallinity of the polyamide helps expand the hybrid blend processing window, including the wood, which requires less heat input and shear for melting and dispersing all ingredients. Hence, the invention provides an opportunity to load more fibrous reinforcement in a polyolefin based concentrate or composite for injection molding.

Consequently, in both compounding process and injection molding, wood plastic compound does not require excessive lubrication or higher melt flow base polymer to mold pellets, spindle, car parts, etc. which is a detriment to mechanical properties of the polyolefin based wood composite. The design of the wood plastic compound can also achieve superior strength to weight ratios and cost advantage for a compounded wood plastic compounded pellet that is let-down into injection molded parts. By drying or not drying the wood plastic compounded pellet you can produce a cellular or solid state molded article. You can also utilize a chemical blowing agent to help promote a cellular composition in either a compounded pellet or injection molded part. By introducing a gas blowing agent, i.e. nitrogen, at the injection molding machine nozzle and or die, you can help create a controlled cellular structure by pressure. Pressure is also effective in the wood plastic compounding process in squeezing moisture and or gas out of the extrudate to make pellets. If pellets are processed properly with an efficient die, minimal voids will be produced internally in the pellet. These voids hold moisture. Respective levels of pellet moisture is less that 0.5 percent. The moisture levels will reflect the compaction of the pellets. In addition, their will be no surface moisture due to the polymer skin that will be visible on the surface. These pellets can range in size from 0.100 to 0.250.

EXAMPLES

Example 1

The compounding extrusion of the wood plastic composite concentrate pellets was accomplished by using a 90 mm co rotating-intermeshing twin screw extruder having eight heated zones along a 40 L/D barrel. The elevated barrel temperature settings in the 1st three zones (480° F. to 450° F.) insure 100% softening of the PA-6 pellets. In spite of compounding at barrel jackets set at such elevated temperatures, there was no indication of the wood fiber degradation.

Polypropylene and other pelletized ingredients (MAPP and PA-6) were metered to the main feed port by an array of gravimetric feeders. The wood flour, that initially had 6-8 wt % water content, was fed directly to the extruder at a side feeder located downstream. A lubricant was also fed into the extruder. An atmospheric vent located just upstream of wood addition allowed for initial flashing of 2-3 wt % of water vapor. The disengagement and removal of the remainder of the water content occurred at the downstream vacuum port equipped with a vent stuffer to prevent entrainment of molten mass into the line to the vacuum pump. The discharge screws of the twin screw pumped the devolatilized WPC melt into a multi-hole die of the Gala underwater pelletizer having a rotating cutter blade arrangement to produce WPC concentrate pellets.

By operating at an high flow rate per die hole having a sufficiently large die hole diameter, wood plastic compounded pellets that were produced that retained an effective amount of sensible heat to promote flashing of entrained moisture off the pellet surface upon exiting the centrifugal dryer. Furthermore, by a combination of high extrudate velocities out of the die holes and compressive forces due to die pressures of 700-800 psi, the resulting pellets were compress having a density (>0.9 g/cc) due to a low degree of porosity.

As a consequence of the dynamic nature of the physical forces imposed on the melt extrudate in the die holes, the wood plastic compounded pellets were covered by a polymer skin that functioned as a barrier layer that hindered absorption of residual surface water during the flash evaporation process along the Witte shaker table. The pellets had a low moisture content, e.g. <1 wt % moisture content. Besides the physical forces responsible for the formation of the outer skin, the polymeric skin is held tenaciously to the interior wood structure by strong adhesive forces. This interfacial adhesion was verified by pressing out wood plastic compounded pellets between polyester films in a Carver Press.

Example 2

The wood plastic compounded pellets, for a period of 4 hours were dried to less than 1% percent moisture. These pellets were blended with pelletized 20 wt % glass fiber reinforced polypropylene copolymer at a 75:25 wt % blend ratio. The wood plastic compound hybrid compositions were then injection molded.

The barrel cylinder temperature settings of the injection molding press were 390° F. (zone 1), 380° F. (zone 2) and 370° F. (zone 3) with the nozzle temperature set at 375° F. and a mold temperature setting of 140° F. for both hybrid blends. Note: that the process temperature required to melt and disperse the WPC pellets and blend with the glass fiber reinforced polypropylene in the injection molding step was significantly lower at 370-390° F. compared to the much higher compounding process temperatures (465° to 430° F.). This is strong evidence that there is substantial alloying of the polyamide 6 resins with the other ingredients in the compounding step, e.g. participation of maleic anhydride and hydroxyl groups on the wood plus physical entanglement between polypropylene molecular chains and molecular groups in the compatibilizer bridge.

Example 3

An injection molder, having a single screw extruder, was charged with four pelletized materials. The first pellets were a wood composite compounded concentrate produced by MGP Ingredients. These compounded pellets would be dried for 8 hrs., prior to blending with other pellets, to reduce the moisture level of the pellets to zero moisture. These wood concentrate pellets were identified as a 60/40 compounded blend. The 60 was actually 58% wood flour by weight and the 40 was a polypropylene by weight. The 2 percent, not mentioned in the 60/40 compounded blend, was a coupling for wood flour and polypropylene. The second pellet was an Exxon Mobil PP 7684KN a copolymer. The third pellet was a Fusabond coupling, a Dupont MD 353. The fourth pellet consisted of a black pigmented Nylon 66 pellet produced by Clariant. These pellets would be dry blended for 100 lbs. batch. The batch would then be vacuumed to the hopper to load the injection molding machine for extruding. The batch blend consisted of 73% wood concentrate, 24% Exxon Mobil copolymer, and 3% Clariant Nylon 66 black pigment. The injection molder had a single screw extruder with a 20:1 L/D and a barrier screw for transporting blend. The barrel profile was set at 400 F in the throat of the machine and 380 F in the last zone. The tool had one cavity that had a temperature of 80 F.

The injection molder was configured with gas assist to pressurize the wood plastic composite extrudate. The gas assist fluid was nitrogen. The nitrogen gas mixed with the wood plastic composite extrudate and compressed the wood flour so that the walls of the molded article were solid in some areas and had small voids in other. More so, the nitrogen gas pressure closest to the injection point of the gate had no visible voids and at the extreme locations of the part away from the gas pressure the were voids.

The invention claimed is:

1. A molded part produced by a method comprising the steps of
   extruding into a mold a composition that includes compressed pellets having a moisture content below 1% comprising
   cellulose flour
   at least one polyolefin,
   a coupling agent,
   a polyamide and
   heating the composition wherein substantial alloying of the ingredients with the addition of polyamide improves thermal properties, having adhesion forces increased to produce a molded part and removing the part from the mold.

2. The molded part claimed in claim 1 wherein the composition comprises maleic anhydride.

3. The molded part claimed in claim 1 wherein the composition in the mold is heated at a given temperature which is at least 370 degrees F., wherein the given temperature is greater than the melt temperature of the polyolefin, and wherein the given temperature is below the melt temperature of the polyamide.

4. The molded part claimed in claim 1 wherein the composition comprises a polypropylene.

5. The molded part claimed in claim 1 wherein the composition comprises a polyethylene.

6. The molded part claimed in claim 1 wherein the cellulose comprises wood flour.

7. The molded part claimed in claim 1 wherein the composition comprises a filler, to include mineral, lubrication, flame retardant, pigment, wheat straw or other natural fibers that will contain moisture inherent to its form before compounding.

8. The molded part claimed in claim 1 wherein the composition comprises a reinforcement, to include inorganic fiber, glass fiber, sisal, hemp, jute or other natural fibers that will contain moisture inherent to its form before compounding.

9. The molded part claimed in claim 1 wherein the composition comprises a polyamide copolymer.

10. The molded part claimed in claim 1 wherein the composition comprises a blowing agent.

11. The molded part claimed in claim 1 wherein the composition comprises a polyamide at less than 6%.

* * * * *